United States Patent [19]
Hahn et al.

[11] Patent Number: 5,721,810
[45] Date of Patent: Feb. 24, 1998

[54] METHOD OF AUTOMATICALLY CONTROLLING AND VERIFYING TELECOMMANDS IN SATELLITE CONTROL SYSTEM

[75] Inventors: Jeung Heon Hahn; Hee Sook Mo; Ho Jin Lee, all of Daejeon, Rep. of Korea

[73] Assignees: Electronics and Telecommunications Research Institute; Korea Telecommunication Authority, both of Rep. of Korea

[21] Appl. No.: 586,607

[22] Filed: Jan. 16, 1996

[30] Foreign Application Priority Data

Mar. 24, 1995 [KR] Rep. of Korea ............... 1995-6344

[51] Int. Cl.$^6$ .................................................. G06F 17/00
[52] U.S. Cl. ................ 395/50; 395/51; 395/905; 395/913; 342/352; 342/355; 342/358
[58] Field of Search ............... 364/265; 395/50, 395/51, 905, 913; 342/352, 355, 358

[56] References Cited

U.S. PATENT DOCUMENTS

| | | | |
|---|---|---|---|
| 4,607,257 | 8/1986 | Noguchi | 340/825.69 |
| 5,109,380 | 4/1992 | Ogino | 371/15.1 |
| 5,295,231 | 3/1994 | Ogino | 395/77 |
| 5,319,574 | 6/1994 | Ikeda | 364/551.01 |

OTHER PUBLICATIONS

Fuchs et al. "plan ERS-1: An Expert Planning System for Generating Spacecraft Mission Plans" Expert Planning Systems, IEE Cont. Pub. 322, pp. 70–75, 1990.

Primary Examiner—Tariq R. Hafiz
Assistant Examiner—Jason W. Rhodes
Attorney, Agent, or Firm—Blakely Sokoloff Taylor & Zafman

[57] ABSTRACT

A method of automatically controlling and verifying telecommands in a satellite control system in which a satellite status analyzing/processing unit and a telecommand producing/executing unit are closely connected with each other to share a knowledge base with information regarding the telecommands. The present method comprises the steps of transmitting the telecommands to a satellite for the control thereof, receiving the resultant telemetry from the satellite, analyzing the received telemetry, inferring telemetry values corresponding to the transmitted telecommands from the information in the knowledge base, verifying a telecommand execution status of the satellite on the basis of the analyzed result and inferred telemetry values and producing a control command upon recognizing an abnormal status of the satellite in accordance with the verified result. According to the present invention, an operator needs not check data one by one to determine whether the telecommand execution is normal or not. Therefore, the present invention has the effect of enhancing the performance and reliability of the satellite control system.

5 Claims, 3 Drawing Sheets

METHOD OF AUTOMATICALLY CONTROLLING AND VERIFYING TELECOMMANDS IN SATELLITE CONTROL SYSTEM

BACKGROUND OF THE INVENTION

1. Field of the Invention

The present invention relates in general to a satellite control system for monitoring and controlling the status of a satellite, in which a satellite status analyzing/processing unit and a telecommand producing/executing unit are closely connected with each other to share a knowledge base with information regarding telecommands, and more particularly to a method of automatically controlling and verifying the telecommands in the satellite control system, which transmits the telecommands to the satellite for the control thereof, receives the resultant telemetry from the satellite, analyzes the received telemetry, infers telemetry values corresponding to the transmitted telecommands from the information in the knowledge base, verifies a telecommand execution status of the satellite on the basis of the analyzed result and inferred telemetry values and produces a control command upon recognizing an abnormal status of the satellite in accordance with the verified result, thereby increasing the performance and reliability of the satellite control system.

2. Description of the Prior Art

In a conventional satellite control system, a satellite status analyzing/processing unit and a telecommand producing/ executing unit is physically connected with each other via a medium such as a local area network (referred to hereinafter as LAN). However, the satellite status analyzing/processing unit and the telecommand producing/executing unit cannot directly exchange information therebetween. For this reason, in level to determine whether the present status of a satellite is normal or not, an operator must personally check page frames of telemetry which are displayed by the satellite status analyzing/processing unit. Namely, telecommands are transmitted to the satellite and executed thereby. Then, a variation of telemetry corresponding to the telecommands, transmitted from the satellite, is checked to determine whether the telecommand execution status of the satellite is normal or not. At this time, the page frames of telemetry are displayed by the satellite status analyzing/processing unit so that they can be checked by the operator. If the telecommand execution status of the satellite is normal, the subsequent telecommand is transmitted to the satellite. On the contrary, in the case where the telecommand execution status of the satellite is not normal, the corresponding control command is executed.

As a result, the operator must check data one by one for the control of the satellite, thereby reducing the performance and reliability of the satellite control system.

SUMMARY OF THE INVENTION

Therefore, the present invention has been made in view of the above problem, and it is an object of the present invention to provide a method of automatically controlling and verifying telecommands in a satellite control system, in which an operator needs not check data one by one to determine whether a telecommand execution status of a satellite is normal or not, thereby enhancing the performance and reliability of the satellite control system.

In accordance with the present invention, in a satellite control system comprising signal message processing means for transmitting low-level telecommand codes to a satellite, receiving the resultant telemetry from the satellite and preprocessing the received telemetry, satellite status analyzing/processing means for inferring telemetry values corresponding to the low-level telecommand codes from data in a satellite status knowledge base, comparing the inferred telemetry values with values of the telemetry received by the signal message processing means, controlling the system in accordance with the compared result, analyzing the contents of frames of the telemetry received by the signal message processing means and displaying the present status of the satellite in accordance with the analyzed result, satellite mission planning/analyzing means for analyzing the telemetry received by the signal message processing means or a mission of the satellite and producing high-level telecommands in accordance with the analyzed result, telecommand producing/executing means including telecommand inference means for retrieving data in a satellite operation knowledge base and converting the high-level telecommands from the satellite mission planning/ analyzing means into mnemonic telecommand codes on the basis of the retrieved data, the telecommand producing/ executing means converting the mnemonic telecommand codes from the telecommand inference means into the low-level telecommand codes on the basis of data in a telecommand code database and transmitting the produced low-level telecommand codes to the satellite through the signal message processing means, and a local area network for connecting the components in the satellite control system with one another, there is provided a method of automatically controlling and verifying the telecommands, comprising the first step of transmitting a telecommand code to the satellite in response to a telecommand transmit request signal from an operator, receiving telemetry which the satellite transmits after executing its mission and analyzing the received telemetry to measure a value thereof; the second step of inferring a telemetry value corresponding to the telecommand code transmitted to the satellite from the data in the satellite status knowledge base; the third step of comparing the value of the received telemetry with the inferred telemetry value; the fourth step of retrieving the data in the satellite operation knowledge base to produce a control command list for an abnormal status of the satellite, if the result compared at the third step indicates the abnormal status of the satellite; and the fifth step of generating a subsequent telecommand code transmit request signal to continuously perform the telecommand code transmission, if the result compared at the third step indicates a normal status of the satellite.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
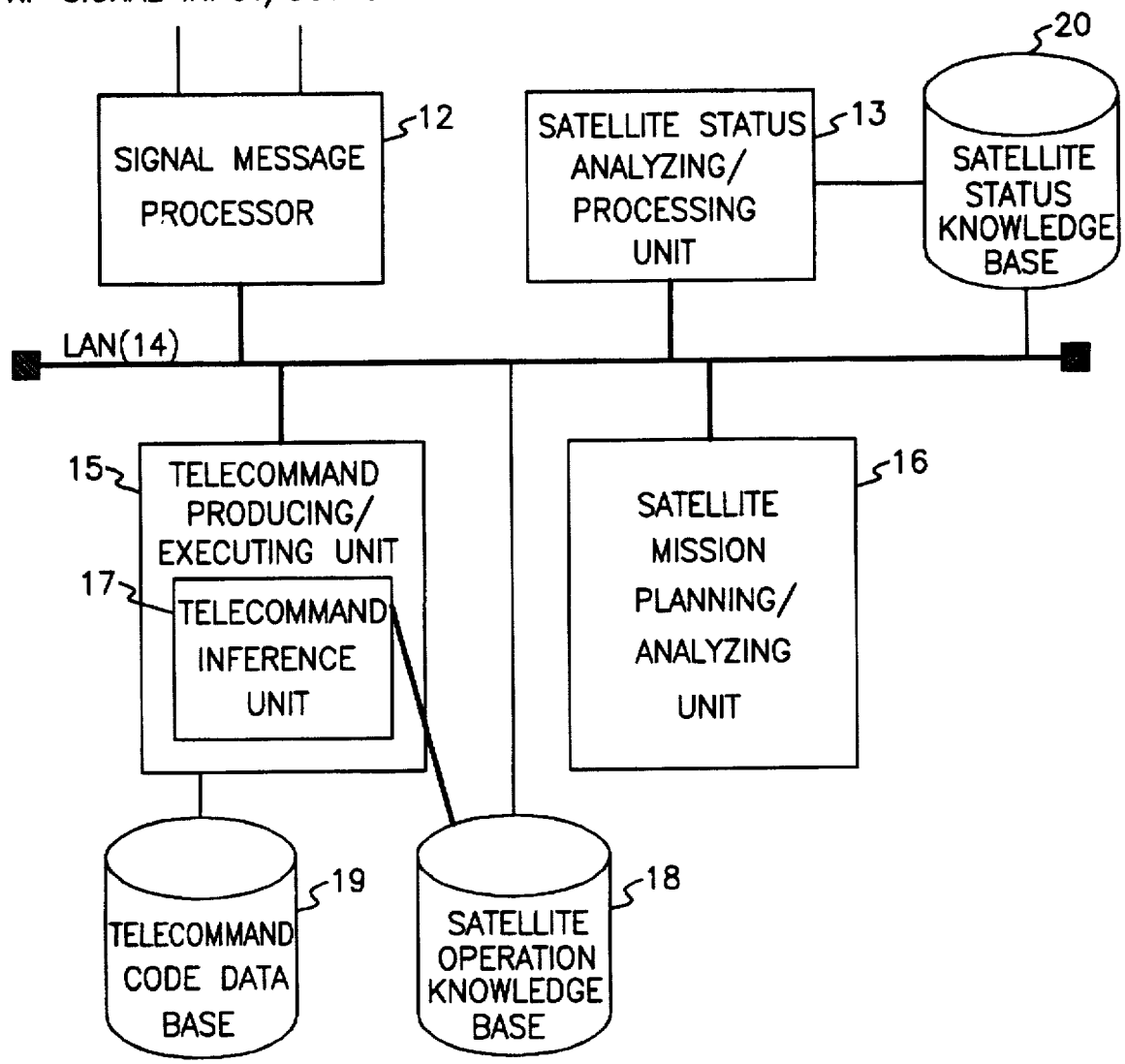
FIG. 1 is a block diagram of a satellite control system to which the present invention is applied.

Referring to FIG. 1, there is shown a block diagram of a satellite control system to which the present invention is applied. The satellite control system performs a sequential control operation to launch a satellite from ground into space and to allow it to enter into orbit. The satellite control system also controls the satellite until it serves its time after entering into orbit.

In FIG. 1, the reference numeral 11 designates a radio frequency (referred to hereinafter as RF) signal input/output link unit, the reference numeral 12 designates a signal message processor, the reference numeral 13 designates a satellite status analyzing/processing unit, the reference numeral 14 designates an LAN, the reference numeral 15 designates a telecommand producing/executing unit, the reference numeral 16 designates a satellite mission planning/analyzing unit, the reference numeral 17 designates a telecommand inference unit, the reference numeral 18 designates a satellite operation knowledge base, the reference numeral 19 designates a telecommand code database and the reference numeral 20 designates a satellite status knowledge base.

The operation of the satellite control system with the above-mentioned construction will hereinafter be described.

The RF signal input/output link unit 11 inputs and outputs RF signals for communication with the satellite. The signal message processor 12 transmits low-level telecommand codes to the satellite, receives the resultant telemetry from the satellite and preprocesses the received telemetry. The satellite status analyzing/processing unit 13 analyzes the contents of frames of the telemetry received by the signal message processor 12 and displays the present status of the satellite in accordance with the analyzed result. The telecommand producing/executing unit 15 produces the low-level telecommand codes and transmits the produced low-level telecommand codes to the satellite through the signal message processor 12. The satellite mission planning/analyzing unit 16 analyzes the telemetry received by the signal message processor 12 or a mission of the satellite and produces high-level telecommands in accordance with the analyzed result. The LAN 14 connects the components in the satellite control system with one another. The telecommand inference unit 17 is provided in the telecommand producing/executing unit 15 to retrieve data in the satellite operation knowledge base 18 and convert the high-level telecommands from the satellite mission planning/analyzing unit 16 into mnemonic telecommand codes on the basis of the retrieved data. The telecommand producing/executing unit 15 converts the mnemonic telecommand codes from the telecommand inference unit 17 into the low-level telecommand codes on the basis of data in the telecommand code database 19. The telecommand producing/executing unit 15 then transmits the produced low-level telecommand codes to the satellite through the signal message processor 12. The satellite status analyzing/processing unit 13 infers telemetry values corresponding to the telecommand codes transmitted to the satellite from data in the satellite status knowledge base 20. The satellite status analyzing/processing unit 13 then compares the inferred telemetry values with values of the telemetry received by the signal message processor 12 and controls the system in accordance with the compared result.

Figure 2:
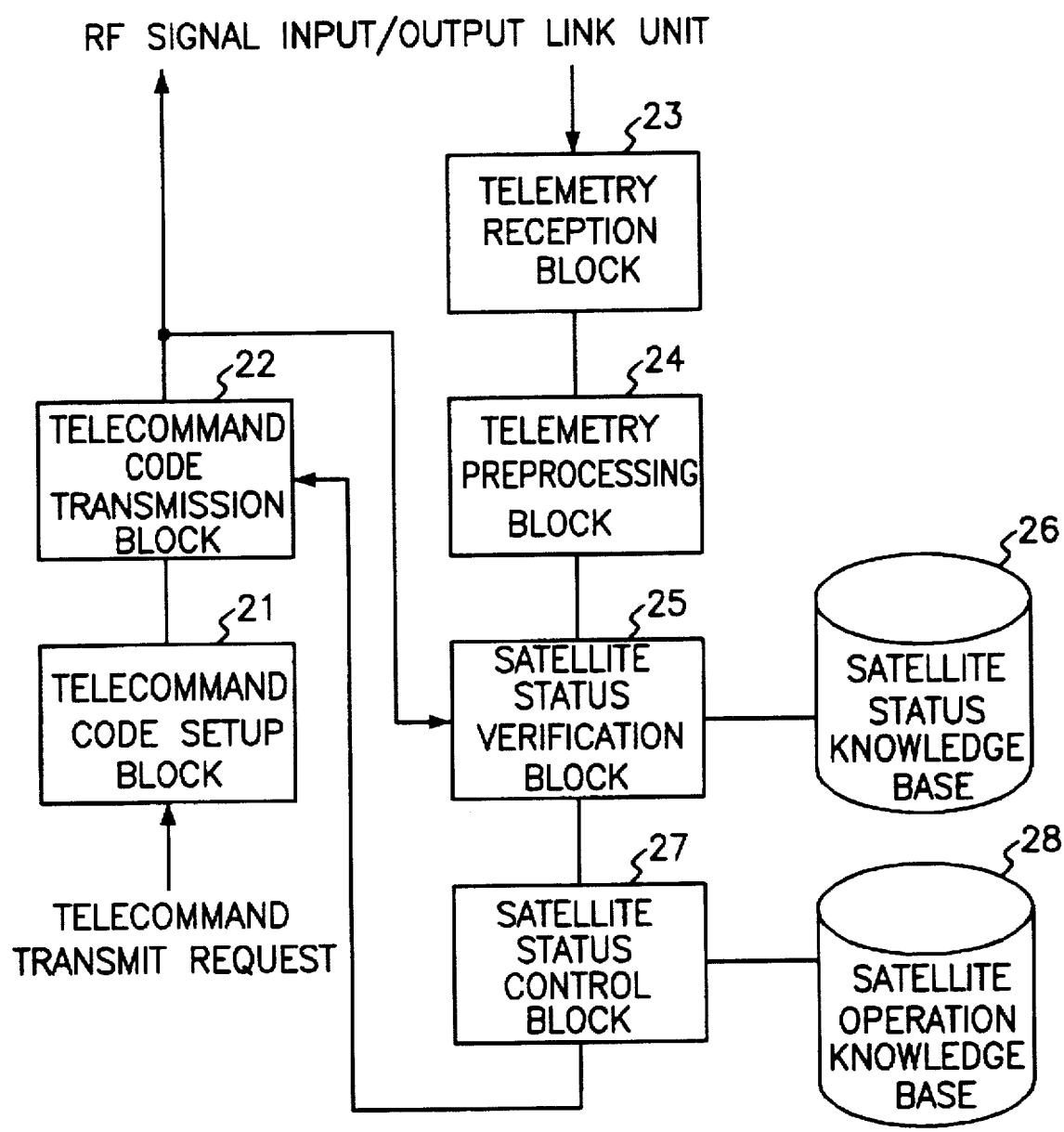
FIG. 2 is a block diagram illustrating a method of automatically controlling and verifying telecommands in the satellite control system in accordance with the present invention.

Referring to FIG. 2, there is shown a block diagram illustrating a method of automatically controlling and verifying telecommands in the satellite control system in accordance with the present invention. As shown in this drawing, the automatic telecommand control/verification method comprises blocks for analyzing the received telemetry, verifying the telecommands transmitted to the satellite in accordance with the analyzed result and controlling the satellite in accordance with the verified result.

A telecommand code setup block 21 is provided in the telecommand producing/executing unit 15. Upon receiving a telecommand transmit request signal from a work station, the telecommand code setup block 21 loads the corresponding telecommand code list into a local memory.

A telecommand code transmission block 22 is also provided in the telecommand producing/executing unit 15. The telecommand code transmission block 22 transmits a first telecommand code contained in the telecommand code list to the satellite. The telecommand code transmission block 22 also sends a telecommand code identifier to a satellite status verification block 25. The telecommand code transmission block 22 further receives a control signal from a satellite status control block 27. In response to the control signal from the satellite status control block 27, the telecommand code transmission block 22 transmits the subsequent telecommand code in the telecommand code list to the satellite or executes a control command when the present status of the satellite is abnormal.

The satellite performs an operation corresponding to the transmitted telecommand code and transmits the resultant telemetry to the satellite control system. The telemetry from the satellite is received by a telemetry reception block 23 and preprocessed by a telemetry preprocessing block 24. The telemetry reception block 23 and the telemetry preprocessing block 24 are provided in the signal message processor 12. The telemetry preprocessing block 24 transfers the preprocessed telemetry to the satellite status verification block 25.

The satellite status verification block 25 is provided in the satellite status analyzing/processing unit 13. The satellite status verification block 25 infers a telemetry value corresponding to the telecommand code transmitted to the satellite from data in a satellite status knowledge base 26. The satellite status verification block 25 compares the inferred telemetry value with a value of the preprocessed telemetry from the telemetry preprocessing block 24 and checks the present status of the satellite in accordance with the compared result. The satellite status verification block 25 then transfers information regarding the present status of the satellite to the satellite status control block 27.

The satellite status control block 27 is also provided in the satellite status analyzing/processing unit 13. The satellite status control block 27 controls the telecommand code transmission block 22 in response to the satellite status information from the satellite status verification block 25. Namely, when the present status of the satellite is normal, the satellite status control block 27 sends a subsequent telecommand code transmit request signal to the telecommand code transmission block 22. Upon receiving the subsequent telecommand code transmit request signal from the satellite status control block 27, the telecommand code transmission block 22 transmits the subsequent telecommand code in the telecommand code list to the satellite. On the contrary, in the case where the present status of the satellite is abnormal, the satellite status control block 27 produces a control command list on the basis of data in a satellite operation knowledge base 28 and sends a control command transmit request signal to the telecommand code transmission block 22. Upon receiving the control command transmit request signal from the satellite status control block 27, the telecommand code transmission block 22 transmits a control command contained in the control command list to the satellite.

Figure 3:
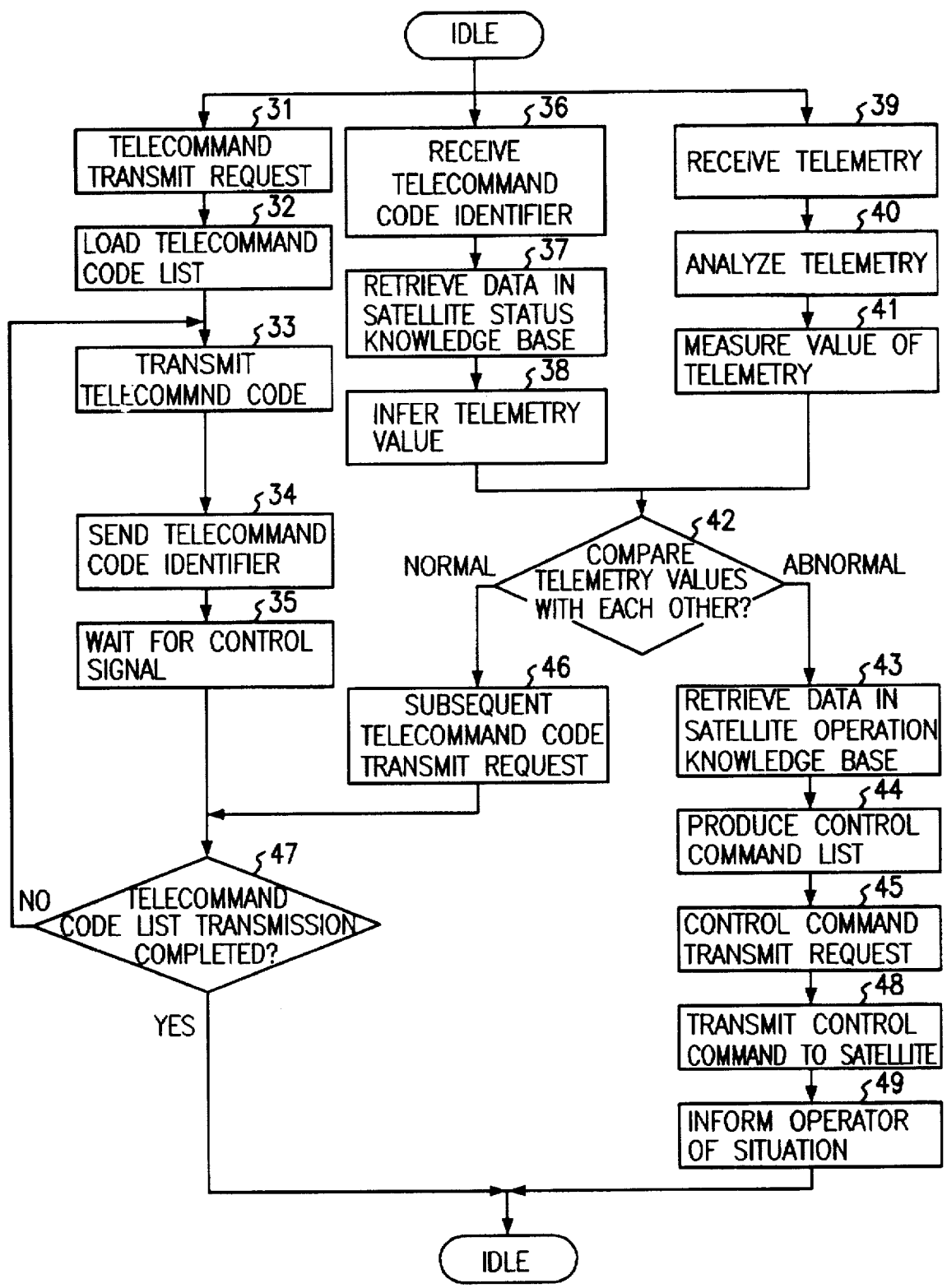
FIG. 3 is a flowchart illustrating the method of automatically controlling and verifying the telecommands in the satellite control system in accordance with the present invention.

Referring to FIG. 3, there is shown a flowchart illustrating the method of automatically controlling and verifying the telecommands in the satellite control system in accordance with the present invention. As shown in this drawing, the automatic telecommand control/verification method comprises the steps of analyzing the received telemetry, verifying the telecommands transmitted to the satellite in accordance with the analyzed result and controlling the satellite in accordance with the verified result.

First, upon receiving a telecommand transmit request signal from an operator at step 31, the telecommand producing/executing unit 15 loads the corresponding telecommand code list into a local memory at step 32 and then transmits a first telecommand code contained in the telecommand code list to the satellite at step 33. The telecommand producing/executing unit 15 also sends a telecommand code identifier to the satellite status analyzing/processing unit 13 at step 34 and then waits for a control signal from the satellite status analyzing/processing unit 13 at step 35.

Upon receiving the telecommand code identifier from the telecommand producing/executing unit 15 at step 36, the satellite status analyzing/processing unit 13 retrieves the data in the satellite status knowledge base at step 37 and infers a telemetry value corresponding to the telecommand code transmitted to the satellite from the retrieved data at step 38.

The satellite executes a control command corresponding to the transmitted telecommand code and transmits the resultant telemetry to the satellite control system. The signal message processor 12 receives the telemetry from the satellite and preprocesses the received telemetry at step 39.

The satellite status analyzing/processing unit 13 analyzes the telemetry received by the signal message processor 12 at step 40 to measure a value thereof at step 41. The satellite status analyzing/processing unit 13 then compares the measured telemetry value with the inferred telemetry value at step 42. If the compared result indicates the abnormal status of the satellite, the satellite status analyzing/processing unit 13 retrieves the data in the satellite operation knowledge base at step 43 and produces a control command list for the abnormal status of the satellite on the basis of the retrieved data at step 44. Then, the satellite status analyzing/processing unit 13 sends a control command transmit request signal to the telecommand producing/executing unit 15 at step 45 to transmit the produced control command list to the satellite. On the contrary, if the compared result indicates the normal status of the satellite, the satellite status analyzing/processing unit 13 sends a subsequent telecommand code transmit request signal to the telecommand producing/executing unit 15 at step 46.

Upon receiving the subsequent telecommand code transmit request signal from the satellite status analyzing/processing unit 13, the telecommand producing/executing unit 15 checks at step 47 whether the telecommand code list transmission has been completed. If it is checked at step 47 that the telecommand code list transmission has been completed, the telecommand producing/executing unit 15 ends the operation. On the contrary, if it is checked at step 47 that the telecommand code list transmission has not been completed, the telecommand producing/executing unit 15 returns to step 33 to transmit the subsequent telecommand code contained in the telecommand code list to the satellite. On the other hand, upon receiving the control command transmit request signal from the satellite status analyzing/processing unit 13, the telecommand producing/executing unit 15 transmits a control command contained in the control command list to the satellite at step 48. The telecommand producing/executing unit 15 informs the operator of such a situation and then ends the operation.

As apparent from the above description, according to the present invention, the operator needs not check data one by one to determine whether the telecommand execution is normal or not. Therefore, the present invention has the effect of enhancing the performance and reliability of the satellite control system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a satellite control system comprising signal message processing means for transmitting low-level telecommand codes to a satellite, receiving the resultant telemetry from the satellite and preprocessing the received telemetry, satellite status analyzing/processing means for inferring telemetry values corresponding to the low-level telecommand codes from data in a satellite status knowledge base, comparing the inferred telemetry values with values of the telemetry received by said signal message processing means, controlling the system in accordance with the compared result, analyzing the contents of frames of the telemetry received by said signal message processing means and displaying the present status of the satellite in accordance with the analyzed result, satellite mission planning/analyzing means for analyzing the telemetry received by said signal message processing means or a mission of the satellite and producing high-level telecommands in accordance with the analyzed result, telecommand producing/executing means including telecommand inference means for retrieving data in a satellite operation knowledge base and converting the high-level telecommands from said satellite mission planning/analyzing means into mnemonic telecommand codes on the basis of the retrieved data, said telecommand producing/executing means converting the mnemonic telecommand codes from said telecommand inference means into the low-level telecommand codes on the basis of data in a telecommand code database and transmitting the produced low-level telecommand codes to the satellite through said signal message processing means, and a local area network for connecting the components in said satellite control system with one another, a method of automatically controlling and verifying the telecommands, comprising the steps of:

(a) transmitting a telecommand code to the satellite in response to a telecommand transmit request signal from an operator, receiving telemetry which the satellite transmits after executing its mission and analyzing the received telemetry to measure a value thereof;

(b) inferring a telemetry value corresponding to the telecommand code transmitted to the satellite from the data in said satellite status knowledge base;

(c) comparing the value of the received telemetry with the inferred telemetry value;

(d) retrieving the data in said satellite operation knowledge base to produce a control command list for an abnormal status of the satellite, if the result compared at said step (c) indicates the abnormal status of the satellite; and (e) generating a subsequent telecommand code transmit request signal to continuously perform the telecommand code transmission, if the result compared at said step (c) indicates a normal status of the satellite.

2. A method of automatically controlling and verifying telecommands in a satellite control system, as set forth in claim 1, wherein said step (a) includes the steps of:

(a-1) loading a telecommand code list into a local memory in response to the telecommand transmit request signal from the operator and then transmitting a first telecommand code contained in the telecommand code list to the satellite;

(a-2) receiving the telemetry from the satellite, preprocessing the received telemetry and analyzing the preprocessed telemetry; and (a-3) measuring a value of the preprocessed telemetry in accordance with the analyzed result.

3. A method of automatically controlling and verifying telecommands in a satellite control system, as set forth in claim 1, wherein said step (b) includes the steps of:

(b-1) loading a telecommand code list into a local memory in response to the telecommand transmit request signal from the operator and then transmitting a first telecommand code contained in the telecommand code list to the satellite;

(b-2) generating a telecommand code identifier and then waiting for a control signal; and (b-3) retrieving the data in said satellite status knowledge base in response to the generated telecommand code identifier and inferring the telemetry value corresponding to the telecommand code transmitted to the satellite from the retrieved data.

4. A method of automatically controlling and verifying telecommands in a satellite control system, as set forth in claim 1, wherein said step (d) includes the steps of:

(d-1) retrieving the data in said satellite operation knowledge base and producing the control command list for the abnormal status of the satellite on the basis of the retrieved data;

(d-2) generating a control command transmit request signal to transmit the produced control command list to the satellite; and (d-3) informing the operator of such a situation and then ending the operation.

5. A method of automatically controlling and verifying telecommands in a satellite control system, as set forth in claim 1, wherein said step (e) includes the steps of:

(e-1) checking in response to the generated subsequent telecommand code transmit request signal whether the transmission of a telecommand code list has been completed;

(e-2) ending the operation if it is checked at said step (e-1) that the telecommand code list transmission has been completed; and (e-3) returning to said step (a) to transmit the subsequent telecommand code contained in the telecommand code list to the satellite, if it is checked at said step (e-1) that the telecommand code list transmission has not been completed.

\* \* \* \* \*